United States Patent
Thomas

(12) 
(10) Patent No.: US 7,040,592 B1
(45) Date of Patent: May 9, 2006

(54) UNIVERSAL FASTENING SYSTEM FOR POLE

(76) Inventor: Joel Thomas, 4640 Barharbor Dr., Lake in the Hills, IL (US) 60156

(*) Notice: Subject to any disclaimer, the term of this patent is extended or adjusted under 35 U.S.C. 154(b) by 0 days.

(21) Appl. No.: 10/952,966

(22) Filed: Sep. 29, 2004

(51) Int. Cl.
*F16M 13/00* (2006.01)
(52) U.S. Cl. ...................... 248/511; 248/201
(58) Field of Classification Search ............... 211/63, 211/68, 70.2, 70.8; 248/201, 539, 511, 515, 248/534, 230.8, 251.7; 43/21.2, 23
See application file for complete search history.

(56) References Cited

U.S. PATENT DOCUMENTS

| | | | | |
|---|---|---|---|---|
| 1,483,666 A | * | 2/1924 | Kovarik | 211/63 |
| 1,584,101 A | * | 5/1926 | Kovarik | 211/63 |
| 2,686,029 A | * | 8/1954 | Raymond | 248/539 |
| 2,831,339 A | * | 4/1958 | Jones | 52/27 |
| 3,812,976 A | * | 5/1974 | Rempel | 211/70.6 |
| 3,995,742 A | * | 12/1976 | Austin et al. | 211/70.8 |
| 4,687,168 A | | 8/1987 | Rupp | |
| 4,856,221 A | * | 8/1989 | Thompson | 43/21.2 |
| 5,732,927 A | * | 3/1998 | Purpura | 248/539 |
| 5,857,658 A | | 1/1999 | Niemiec | |
| 6,003,826 A | | 12/1999 | Galloway, III | |
| 6,073,900 A | * | 6/2000 | Chapman | 248/313 |
| 6,227,845 B1 | | 5/2001 | Pillow et al. | |
| 6,370,810 B1 | * | 4/2002 | Widerman | 43/21.2 |
| 6,375,146 B1 | | 4/2002 | Painchaud | |
| D469,342 S | | 1/2003 | Metzentine | |
| D472,653 S | | 4/2003 | Northrop | |
| 6,561,471 B1 | * | 5/2003 | Hawie | 248/201 |
| 6,598,842 B1 | | 7/2003 | Yeh | |
| 6,676,094 B1 | | 1/2004 | Brown | |
| 2003/0127579 A1 | | 7/2003 | Olexovitch | |
| 2004/0046098 A1 | | 3/2004 | Painchaud | |

FOREIGN PATENT DOCUMENTS

FR  2599939 A3 * 12/1987 ............... 43/21.2

* cited by examiner

*Primary Examiner*—Ramon O Ramirez
(74) *Attorney, Agent, or Firm*—Patula & Associates, P.C.

(57) ABSTRACT

A universal fastening system for a pole comprises an adjustable upper bracket and an adjustable lower bracket each having a plurality of mounting holes, allowing the brackets to accommodate poles of varying size. The upper and lower brackets are mounted to one or more planes of a structure and cooperatively engage and support the pole.

19 Claims, 7 Drawing Sheets

UNIVERSAL FASTENING SYSTEM FOR POLE

The present disclosure relates generally to a fastening system for a pole or similar elongated object. In particular, the present disclosure relates to a fastening system which is adjustable to accommodate poles of varying diameters and lengths, and which is mountable to various types of structures. Specifically, the present disclosure relates to a universal fastening system for a pole, such as a bamboo torch pole, for quickly and easily mounting poles of different sizes and lengths in a desired location on a deck or other structure.

BACKGROUND OF THE INVENTION

There has long been a need to fasten poles to structures, for example a flag pole or a torch pole. However, due to poles coming in all different sizes and lengths, it has proven difficult to consistently mount different poles to different structure. Further, many fasteners which have been used to mount poles either do not provide adequate support or stability for the pole in particular situations, or cannot be suitably fastened to a desired location on a structure such as a deck.

Torches in particular, such as bamboo torches, are popular with many homeowners for outdoor lighting, mosquito repellant, or simply for aesthetic appearance or ambiance. Typically, these torches have elongated poles which either sit in a base/stand, or are driven into the ground. However, in both instances, the torches are prone to tipping or being knocked over, with the potential for personal injury or property damage.

Accordingly, there is a need in the bamboo torch industry, as well as other industries manufacturing poles, for a fastening system which is flexible in design for fastening virtually any pole in any desired location, which is fast and easy to mount, and which is sturdy and strong. The present invention fulfills such a need, and provides numerous other benefits and advantages in fastening poles.

BRIEF SUMMARY OF THE INVENTION

The present disclosure relates to a universal fastening system for a pole and comprises an adjustable upper bracket, and an adjustable lower bracket, which may be fastened with suitable fasteners to a structure such as a deck railing. The upper bracket preferably is in the form of a flexible band or strap having a plurality of mounting holes. The lower bracket preferably is in the form of a flexible cup-like receptacle having a plurality of mounting holes. The plurality of mounting holes allows the brackets to accommodate poles of varying diameter.

The upper and lower brackets are mounted to a structure and cooperatively engage and support the pole. The upper bracket can be mounted on up to two different planes of a structure, while the lower bracket can be mounted on up to three different planes of a structure, thus providing the flexibility necessary to mount the pole in any desired location.

In use, the upper bracket prevents lateral movement of the pole, while preferably allowing vertical movement of the pole, relative to the longitudinal axis of the bracket. The lower bracket engages the bottom end of the pole, and prevents lateral and downward movement of the pole end, while preferably allowing for upward movement.

Once the fastening system is fastened, the pole preferably can be inserted through the upper bracket and slid downward until the end of the pole is engaged by the lower bracket. The pole is thus securely fastened to the deck until removed, and will not tip or get knocked over.

Accordingly, it is the principal object of the present disclosure to provide a fastening system for a pole.

It is a further object of the present disclosure to provide a universal fastening system which is quickly and easily mounted to a structure, and provides flexibility and adjustability in mounting poles of varying diameter and length.

It is also an object of the present disclosure to provide a fastening system which is flexible in design for mounting a pole in any desired location.

It is another object of the present disclosure to provide a fastening system which securely mounts a pole to a structure, while allowing the pole to be selectively removed from and repositioned in the fastening system with ease.

It is an additional object of the present disclosure to provide a fastening system for a pole which can be adjustably mounted to various planes of a structure.

Numerous other advantages and features of the disclosure will become readily apparent from the following detailed description, from the claims and from the accompanying drawings in which like numerals are employed to designate like parts throughout the same.

BRIEF DESCRIPTION OF THE DRAWINGS

A fuller understanding of the foregoing may be had by reference to the accompanying drawings wherein.

DETAILED DESCRIPTION OF THE DISCLOSED EMBODIMENT

Figure 1:
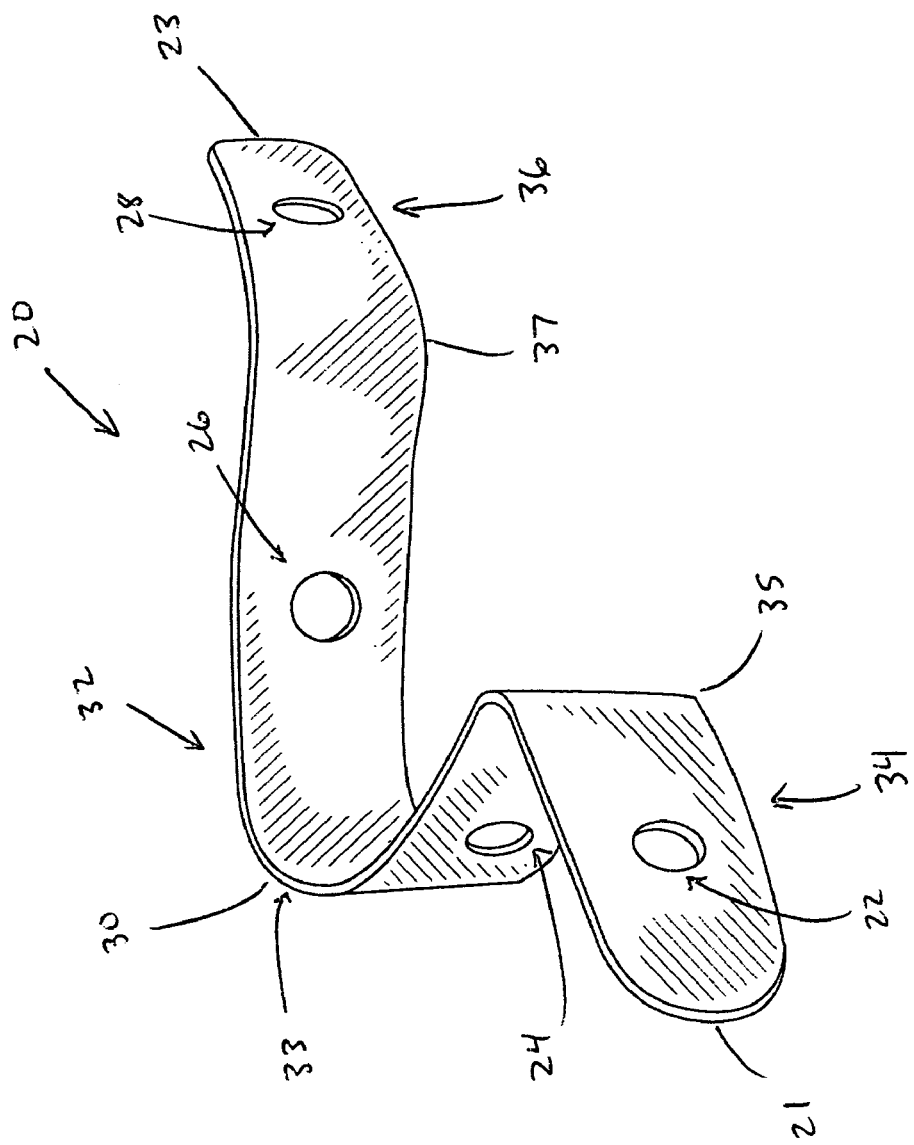
FIG. 1 is a perspective view illustrating one embodiment of an adjustable upper bracket of the fastening system of the present disclosure in a first configuration.

While the invention is susceptible of embodiment in many different forms, there is shown in the drawings and will be described herein in detail one or more embodiments of the present disclosure. It should be understood, however, that the present disclosure is to be considered an exemplification of the principles of the invention, and the embodiment(s) illustrated is/are not intended to limit the spirit and scope of the invention and/or the claims herein.

FIG. 1 is a perspective view illustrating one embodiment of an adjustable upper bracket 20 of the fastening system of the present disclosure in a first configuration. As can be seen, upper bracket 20 comprises a generally elongated band of any suitable material which is capable of easily flexing, bending or otherwise distorting to accomplish the purposes described herein. Preferably, the upper bracket 20 is of a non-corrosive metal, plastic or rubber material.

As illustrated, the upper bracket 20 comprises a plurality of mounting holes 22, 24, 26 and 28 for mounting the bracket to a structure. While four holes are illustrated, it should be understood that upper bracket 20 can have any number of holes, preferably two or more. To be adjustable to accomplish the purposes described herein, upper bracket 20 preferably includes three or more holes.

Holes 24 and 26 are illustrated as being spaced equidistant from the midpoint 30 of upper bracket 20. Similarly, holes 22 and 28 are illustrated as being spaced equidistant from the midpoint 30. It should be understood however that this equidistant spacing of the holes is not a necessity to accomplish the purposes described herein, as discussed in more detail below.

To mount a pole (shown in FIGS. 5 and 6) to a generally flat surface, the upper bracket 20 is preferably positioned approximate its midpoint 30 in front of the pole. The upper bracket 20 is then bent or flexed around the pole until the ends 21 and 23 of the upper bracket 20 contact the structure. Thus, the upper bracket 20 is "divided" into three sections: a pole engaging section 32 having a generally convex bend 33 approximate the midpoint 30, and two mounting sections 34 and 36 which contact the structure on each side of the pole. Generally concave bends 35 and 37 exist, respectively, between the pole engaging section 32 and the mounting sections 34 and 36. The hole closest to the pole engaging section 32 in each mounting section 34 and 36 is selected, and a suitable fastener such as a screw or the like is placed through the two selected holes. It is foreseen that other holes in the mounting sections could be used instead of or in addition to the one closest the pole engaging section 32.

For example, as illustrated in FIG. 1, upper bracket 20 is shown configured in a position to accommodate the largest diameter pole it can fasten to a structure, i.e., when the two outermost holes 22 and 28 are selected to mount the pole to the structure. In such a configuration, hole 22 is in mounting section 34, hole 28 is in mounting section 36, and holes 24 and 26 are in pole engaging section 32. A fastener is placed through holes 22 and 28 to secure the pole to the structure. Further, a fastener could be placed through hole 24 and/or hole 26 and into the pole, as a measure of added stability and security. In such an instance, the pole could not simply be lifted and slid out from the pole engaging section 32, without first removing any fastener in holes 24 and/or 26.

Alternatively, the pole can be mounted in the following manner. A starting hole, preferably but not necessarily the first hole 22, can be selected and the bracket fastened to a structure using the starting hole. Thereafter, the free end, i.e., end 23, of upper bracket is moved away from the structure, and the pole is positioned under the upper bracket 20 and proximate the first hole 22. The upper bracket is then bent or flexed around the pole until end 23 contacts the structure, forming mounting section 36. A fastener is placed through a hole in mounting section 36 to complete the mounting of the pole to the structure.

Figure 2:
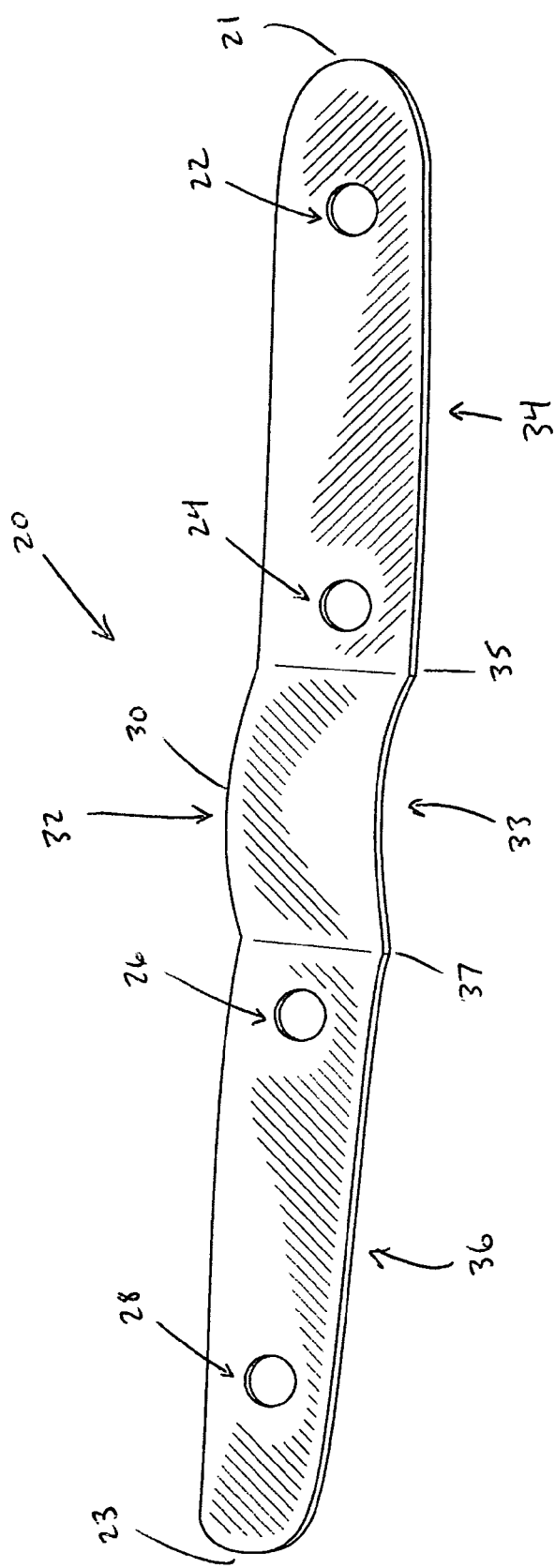
FIG. 2 is a front perspective view illustrating the adjustable upper bracket of FIG. 1 in a second configuration.

FIG. 2 is a front perspective view illustrating the adjustable upper bracket 20 in a second configuration. As illustrated in FIG. 2, upper bracket 20 has been configured in a position to accommodate the smallest diameter pole it can fasten to a structure, i.e., when the two holes closest to midpoint 30 are selected to mount the pole to the structure, i.e., holes 24 and 26. In such a configuration, hole 24 is in mounting section 34, as is hole 22, and hole 26 is in mounting section 36, as is hole 28. No holes are in pole engaging section 32 as illustrated. However, the upper bracket could have an additional hole proximate midpoint 30 to allow a fastener to engage the pole in this configuration of upper bracket 20. Convex bend 33 is again approximate the midpoint 30; and concave bends 35 and 37 exist, respectively, between the pole engaging section 32 and the mounting sections 34 and 36.

It should be understood that holes 26 and 28 can be used in this same manner to mount a pole, instead of holes 24 and 26. Similarly, holes 22 and 24 can be used instead of holes 24 and 26. Where the pole diameter is too large to select two adjacent holes, but not large enough to select the two outermost holes, holes 22 and 26, or holes 24 and 28 can be selected.

Accordingly, the upper bracket 20 as illustrated with four holes, can generally mount poles of three diameter ranges, defined as small diameter poles, medium diameter poles, and large diameter poles. In other words, poles with a diameter less than or equal to the space defined by pole engaging section 32 when two adjacent holes (i.e., holes 22 and 24, holes 24 and 26, or holes 26 and 28) are selected would fall into the small diameter range. Poles with a diameter greater than the small diameter range but less than or equal to the space defined by pole engaging section 32 when the first and third holes (i.e., holes 22 and 26) or the second and forth holes (i.e., holes 24 and 28) are selected would fall into the medium diameter range. Poles with a diameter greater than the medium diameter range but less than or equal to the space defined by the pole engaging section 32 when the two outermost holes (i.e., holes 22 and 28) are selected would fall into the large diameter range.

The secure mounting of poles of different diameters within the same diameter range can be accomplished simply be adjusting the position of the mounting hole relative to the pole. In other words, mounting section 34 and/or mounting section 36 can be slid towards or away from the pole to either increase or decrease, respectively, the space defined by the pole engaging section 32.

If additional holes are added, additional diameter ranges would exist. Further, by spacing the holes at different distances relative to each other, various diameter ranges would exist. For example, if hole 22 and 24 where one and a half inches apart, holes 24 and 26 two and a half inches apart, and holes 26 and 28 three and a half inches apart, a total of six diameter ranges would exist. Specifically, selecting holes 22 and 24 would result in a first range (one and a half inches between holes); selecting holes 24 and 26 would result in a second range (two and a half inches between holes); selecting holes 26 and 28 would result in a third range (three and a half inches between holes); selecting holes 22 and 26 would result in a fourth range (four inches between holes); selecting holes 24 and 28 would result in a fifth range (six inches between holes); and selecting holes 22 and 28 would result in a sixth range (seven and a half inches between holes).

The above described methods for mounting the upper bracket 20 are equally useful in mounting the upper bracket 20 to two different surfaces of a structure as well. For example, when attaching a pole to a ballaster, the upper bracket 20 can be positioned proximate its midpoint in front of the pole, and then bent around the pole until the ends contact the respective sides of the ballaster. The desired holes in contact with the sides of the ballaster are selected, and fasteners are placed there through.

Alternatively, a starting hole is selected and a fastener placed through and into one side of the ballaster. The pole is positioned in front of the ballaster, and the upper bracket is bent around the pole until the free end contacts the opposite side of the ballaster. The desired hole is located in the second mounting section, and a fastener is place there through. It should be understood that the upper bracket 20 remains fully adjustable when attaching to different surfaces in different planes of a structure.

Figure 3:
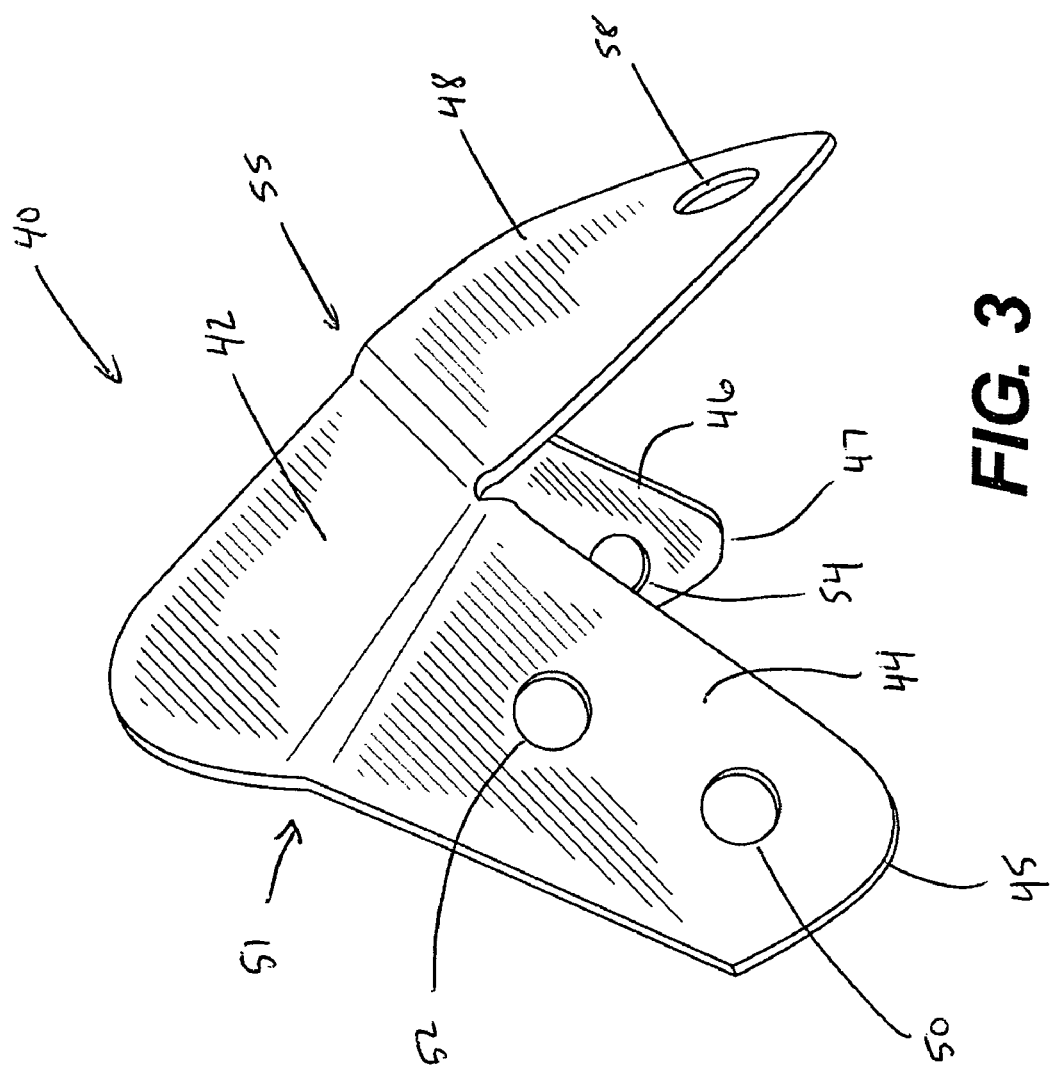
FIG. 3 is a perspective view illustrating one embodiment of an adjustable lower bracket of the fastening system of the present disclosure in a first configuration.

FIG. 3 is a perspective view illustrating one embodiment of an adjustable lower bracket 40 of the fastening system of the present disclosure in a first configuration. In general, the configuration of the lower bracket 40 shown in FIG. 3 is used to mount the lower bracket 40 to two or more different surfaces of a structure, such as a deck ballaster.

As can be seen, lower bracket 40 comprises a generally cup-like receptacle of any suitable material which is capable of easily flexing, bending or otherwise distorting to accomplish the purposes described herein. Preferably, the lower bracket 40 is of a non-corrosive metal, plastic or rubber material. The cup-like receptacle shape of lower bracket 40 is defined by a central portion 42, two arm portions 44 and 46, and a foot portion 48.

As illustrated, the lower bracket 40 comprises a plurality of mounting holes for mounting the bracket to a structure. Specifically, arm portion 44 has two holes 50, 52; arm portion 46 has two holes 54 and 56 (see FIG. 7); and foot portion has one hole 58. While five holes are illustrated, it should be understood that lower bracket 40 can have any number of holes. For example, arm portions 44 and 46 could have more or less than two holes. Further, foot portion 48 could have more than one hole, or could be made without a hole. Still further, central portion 42 could have one or more holes for fastening the lower bracket 40 to the pole, if desired. In such a situation, the lower bracket 40 could function without foot portion 48.

To secure the end of a pole (shown in FIGS. 5 and 7) to a surface, the lower bracket 40 is preferably positioned around the end of the pole, such that the end of the pole is received in the cup-like receptacle of the lower bracket 40. The arms 44 and 46 of lower bracket 40 are then bent or flexed around the pole until the ends 45 and 47 of arm portions 44 and 46, respectively, of the lower bracket 40 contact the structure. In this configuration, generally concave bends 51 and 53 (see FIGS. 4 and 7) exist, respectively, between the central portion 42 and the arm portions 44 and 46. The hole closest to the central portion 42 in each arm portion 44 and 46 which contacts or nearly contacts the structure is selected, and a suitable fastener such as a screw or the like is placed through the two selected holes. It should be understood that other holes in the arm portions 44 and 46 could be used instead of or in addition to the above described one closest the central portion 42.

Once arm portions 44 and 46 are fastened to the structure, foot portion 48 can be bent under the end of the pole until it contacts the structure, such as the underside of the deck ballaster or the front side of the deck ballaster. A generally concave bend 55 exists between central portion 42 and foot portion 48. If fastening to the front side of a deck ballaster or other flat surface such as a wooden fence, a second, generally convex bend would exist in foot portion 48. A fastener is then placed through hole 58 and into the structure. If more than one hole is present in foot portion 48, the appropriate hole is selected to receive the fastener.

Alternatively, the foot portion 48 need not be fastened to the structure. The foot portion 48 is configured such that it is angled inward toward the structure when in use. As such the end of the pole will abut the foot portion 48, thus preventing downward movement of the pole. In this situation, a fastener could be placed through hole 58 and into the pole for added stability and security.

Figure 4:
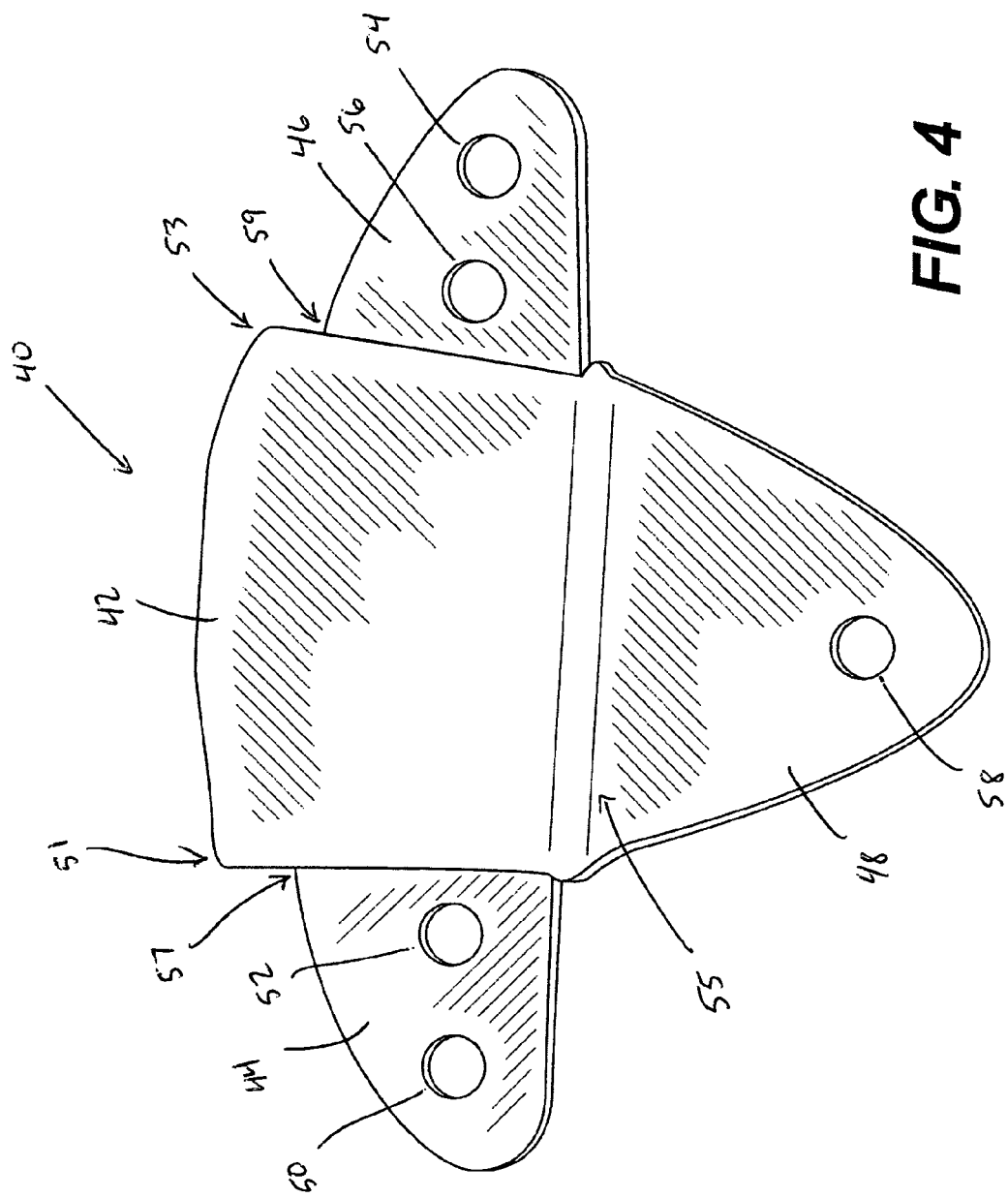
FIG. 4 is a front perspective view illustrating the adjustable lower bracket of FIG. 3 in a second configuration.

FIG. 4 is a front perspective view illustrating the adjustable lower bracket 40 in a second configuration. As illustrated in FIG. 4, lower bracket 40 has been configured in a position to mount to a flat surface. In such a configuration, in addition to generally concave bends 51 and 53, each of the arm portions 44 and 46 includes a generally convex bend 57 and 59 respectively, in the same manner as described above with respect to the upper bracket in FIG. 1. Fasteners are placed through holes 50 and 54 to mount the lower bracket 40 to the flat surface of a structure.

As with the upper bracket, the four holes 50, 52, 54 and 56 in the arm portions 44 and 46 of the lower bracket 40 allow the lower bracket 40 to generally mount pole ends of three size ranges, namely small, medium and large. Holes 52 and 56 are selected for small pole ends. Holes 52 and 54, or holes 50 and 56 are selected for medium pole ends. Holes 50 and 54 are selected for large pole ends. Again, if additional holes are added, or if the holes are spaced at different distances relative to each other, additional ranges would exist, as described above with respect to the upper bracket. It should be understood that the lower bracket 40 remains fully adjustable when attaching to different surfaces in different planes of a structure.

Figure 5:
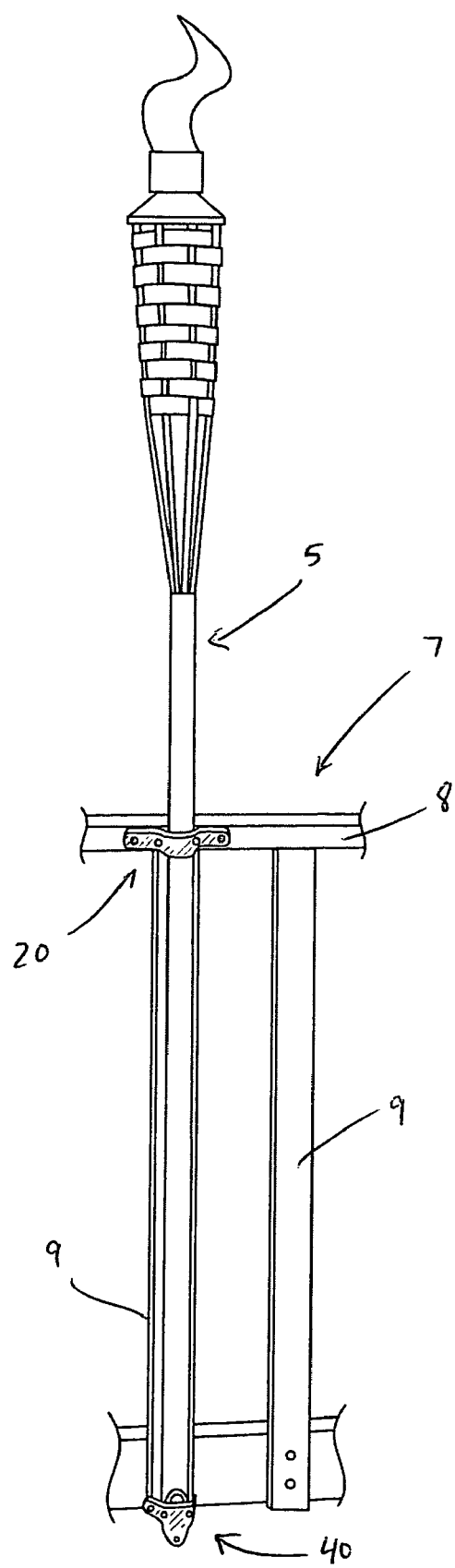
FIG. 5 is a front perspective view illustrating the fastening system of the present disclosure mounting a torch pole to a deck.
Figure 6:
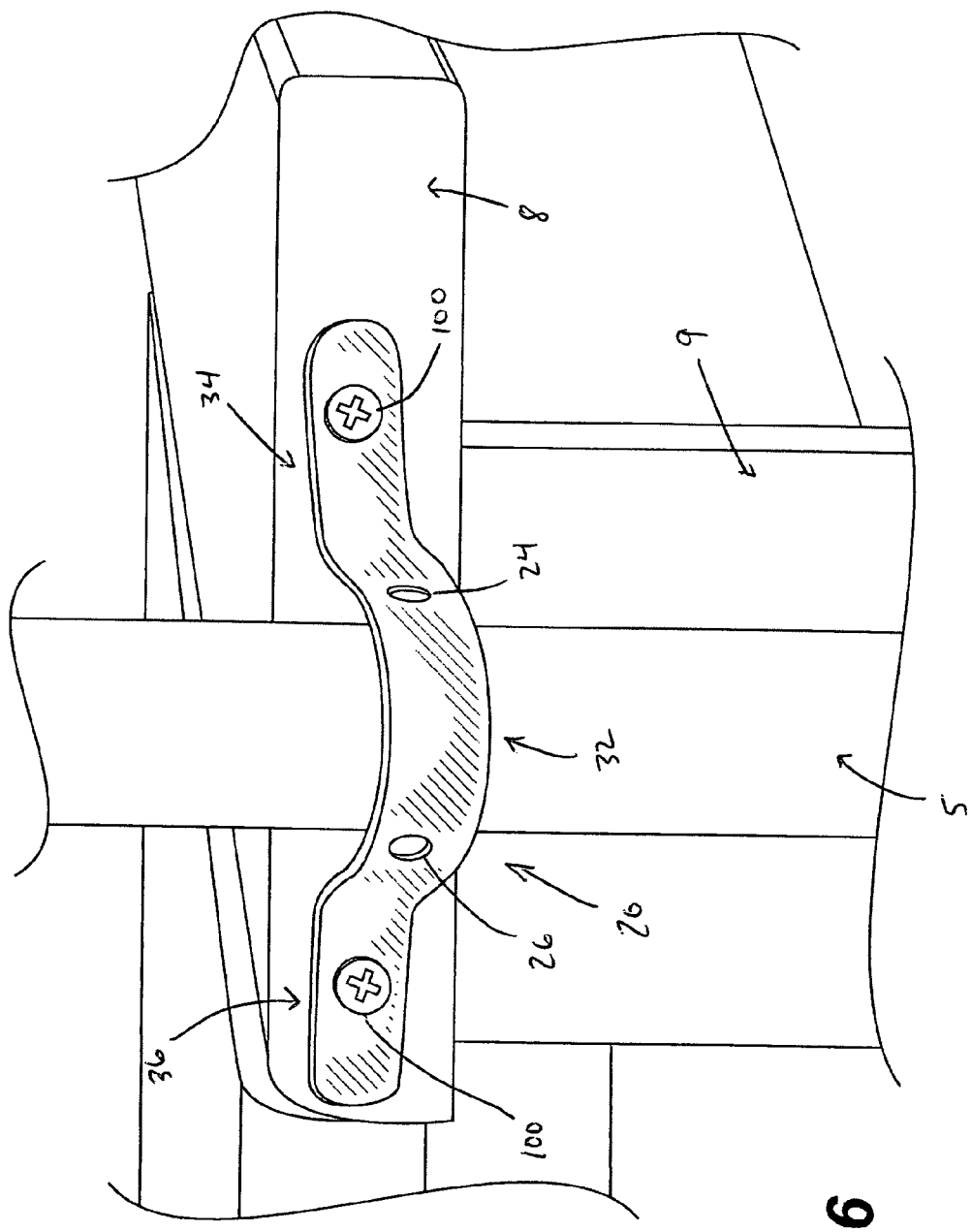
FIG. 6 is an enlarged perspective view illustrating the adjustable upper bracket mounting a pole to a deck railing.
Figure 7:
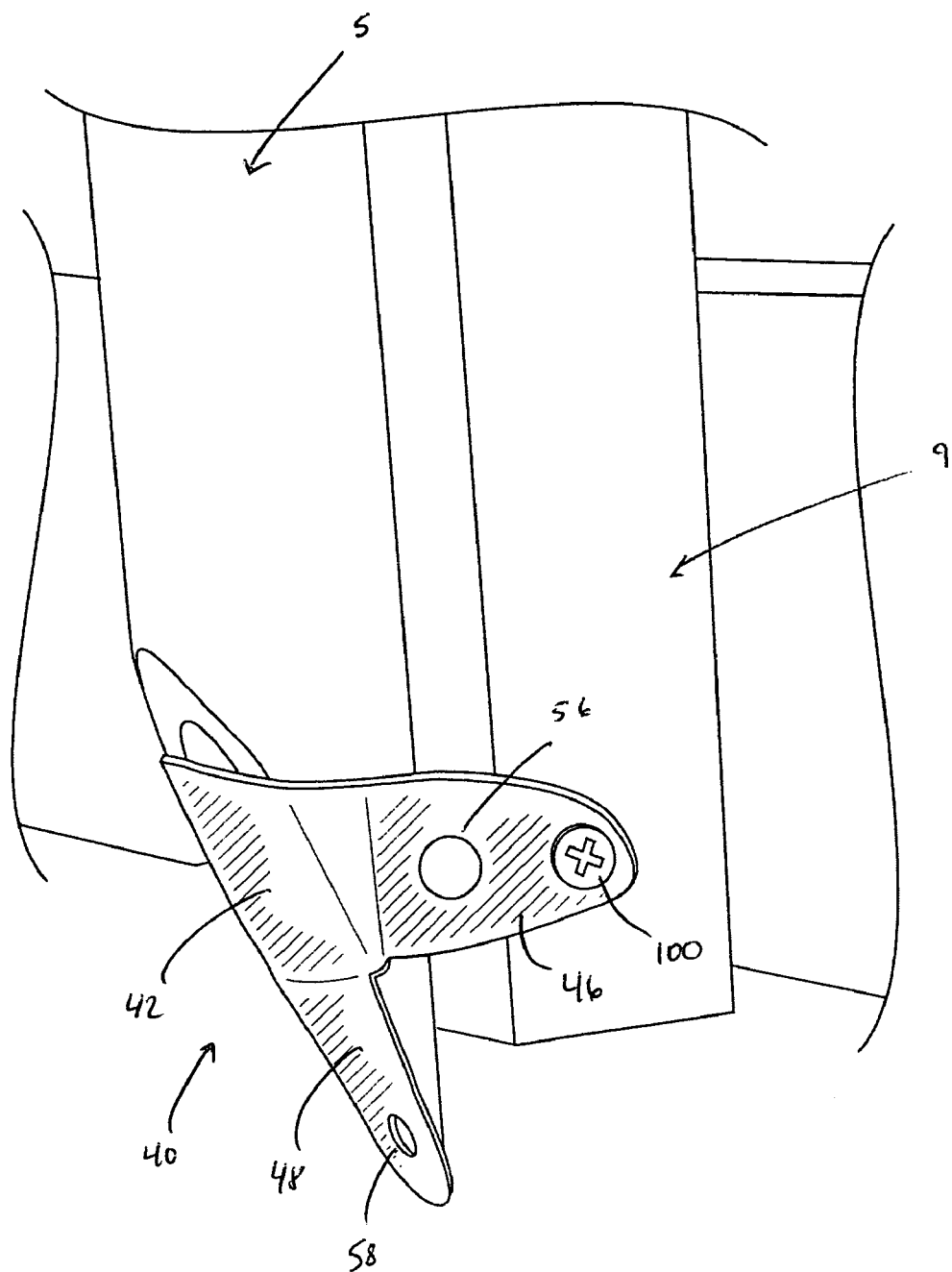
FIG. 7 is an enlarged perspective view illustrating the adjustable lower bracket mounting a pole to a deck ballaster.

FIG. 5 is a front perspective view illustrating the fastening system of the present disclosure mounting a torch pole 5 to a deck 7. As illustrated, upper bracket 20 is mounted to a deck railing 8, as best seen in FIG. 6. Lower bracket 40 is mounted to a deck ballaster 9, at the end thereof, as best seen in FIG. 7. The upper bracket 20 and the lower bracket 40 cooperate to securely mount the pole 5 to the deck. The upper bracket 20 prevents lateral movement of the pole 5, while preferably allowing vertical movement of the pole 5, relative to the longitudinal axis of the upper bracket 20. The lower bracket 40 engages the bottom end of the pole 5, and prevents both lateral and downward movement of the pole end, while preferably allowing for upward movement.

Once the fastening system is fastened, the pole 5 preferably can be inserted through the upper bracket 20 and slid downward until the end of the pole 5 is engaged by the lower bracket 40. The pole 5 can be removed by lifting it up and out of engagement with the brackets 20 and 40. The pole 5 thus can be securely fastened to the deck 7 or other structure until removed, and will not tip or get knocked over. Alternatively, the pole can be fastened to the upper bracket 20 and/or the lower bracket 40 to prevent the pole from being removed, as described above.

FIG. 6 illustrates an enlarged perspective view of the adjustable upper bracket 20 mounting pole 5 to the deck railing 8. As can be seen, fasteners 100 have been placed through mounting holes 22 and 28 of upper bracket 20 to secure the pole 5 to the deck railing 8. Fasteners 100 are illustrated as screws, but could be any suitable fasteners known in the art, such as nails, bolts, etc. If desired, fasteners can be placed through holes 24 and/or 26 and into pole 5 for added stability and security.

FIG. 7 illustrates an enlarged perspective view of the adjustable lower bracket 40 mounting pole 5 to the deck ballaster 9. Fasteners 100 have been placed through mounting holes 54 and 50 (not shown) of lower bracket 40 to secure the end of the pole 5 to the deck ballaster 9. Additionally, a fastener can be placed through hole 58 and into the end of the pole 5 or into the bottom or front side of deck ballaster 9 if desired for added stability and security.

It is to be understood that the embodiment(s) herein described is/are merely illustrative of the principles of the present invention. Various modifications may be made by those skilled in the art without departing from the spirit or scope of the claims which follow.

For example, the brackets 20 and 40 can have various lengths and widths, as desired, and each could take any suitable shape or form, so long as they accomplish the purposes described herein. It is foreseen that the lower bracket need not engage the end of the pole, but could engage the pole at any distance from its end. Further, an upper bracket could replace the lower bracket, such that two "upper" brackets are used to mount the pole. Similarly, a lower bracket could replace the upper bracket, such that two "lower" brackets are used to mount the pole. Additionally, three or more upper or lower brackets could be used for added stability, especially for longer poles.

It is also foreseen that brackets 20 and 40 could be secured to any desired structure in any suitable manner apart from those described herein, including for example a wooden fence, a cylindrical post, etc. Further, the upper and lower brackets could be mounted on different structures, and/or in a misaligned fashion, allowing the pole to be mounted at any suitable angle if desired.

In general, the upper bracket 20 can be mounted in one or two distinct plans, while the lower bracket 40 can be mounted in one, two or three distinct plans. Both the upper bracket 20 and lower bracket 40 will have one or more bends so as to encompass the pole being mounted, and then to conform to the surface of the structure to which each will attach.

The brackets 20 and 40 of the present disclosure can be made from any suitable material, such as any suitable metal, plastic or rubber, sufficient to serve the intended purpose of each part. Further each part can be coated or suitable treated to prevent corrosion, or for decorative purposes.

What is claimed is:

1. A fastening system for a pole, comprising:
a first bracket having at least one mounting hole; and
a second bracket, cooperatively associated with the first bracket, and having at least one mounting hole;
wherein at least one of the first bracket and the second bracket has a plurality of mounting holes and is selectively adjustable to fasten poles of varying diameter via the plurality of mounting holes; and
wherein the second bracket has a generally cup-shaped configuration.

2. The fastening system of claim 1, wherein the first bracket is adjustable to fasten poles of varying diameter.

3. The fastening system of claim 1, wherein the second bracket is adjustable to fasten poles of varying diameter.

4. The fastening system of claim 1, wherein the first bracket has at least two mounting holes and is adapted to mount in up to two distinct planes by selectively positioning one of the at least two mounting holes on one plane and by positioning another of the at least two mounting holes on another plane.

5. The fastening system of claim 1, wherein the second bracket has at least three mounting holes and is adapted to mount in up to three distinct planes by selectively positioning a first of the at least three mounting holes on a first plane, a second of the at least three mounting holes on a second plane and a third of the at least three mounting holes on a third plane.

6. The fastening system of claim 1, wherein the first bracket has a generally band-shaped configuration.

7. The fastening system of claim 1, wherein the second bracket has a first arm portion, a second arm portion, and a foot portion.

8. The fastening system of claim 1, wherein the first bracket includes at least three mounting holes, and wherein adjustability of the first bracket is determined by selectively using two of the at least three mounting holes.

9. The fastening system of claim 1, wherein the second bracket includes at least three mounting holes, and wherein adjustability of the second bracket is determined by selectively using at least two of the at least three mounting holes.

10. The fastening system of claim 1, wherein the first bracket is comprised of a resilient material.

11. The fastening system of claim 1, wherein the second bracket is comprised of a resilient material.

12. A method of fastening a pole, comprising the steps of:
positioning a pole proximate a structure;
positioning a first bracket having a plurality of mounting holes around an upper portion of the pole;
adjusting the first bracket to approximately the diameter of the pole by selectively using two of the plurality of mounting holes;
fastening the first bracket to the structure using the selected two of the plurality of mounting holes;
positioning a second bracket having a generally cup-shaped configuration and having a plurality of mounting holes around a lower portion of the pole;
adjusting the second bracket to approximately the diameter of the pole by selectively using two of the plurality of mounting holes; and
fastening the second bracket to the structure using the selected two of the plurality of mounting holes.

13. The method of claim 12, further comprising the step of fastening the first bracket to the pole via a fastening hole in the first bracket.

14. The method of claim 12, further comprising the step of fastening the second bracket to the pole via a fastening hole in the second bracket.

15. A fastening system for a pole, comprising:
a first bracket having a plurality of mounting holes; and
a second bracket, cooperatively associated with the first bracket, and having a plurality of mounting holes;
wherein at least one of the first bracket and the second bracket is selectively adjustable to fasten poles of varying diameters by using select ones of the respective plurality of mounting holes; and
wherein the second bracket has a first arm portion, a second arm portion, and a foot portion.

16. The fastening system of claim 15, wherein the first bracket has a first end and a second end, and wherein at least one of the first end and the second end has a plurality of mounting holes.

17. The fastening system of claim 15, wherein at least one of the first arm portion, the second arm portion, and the foot portion has a plurality of mounting holes.

18. The fastening system of claim 15, wherein the first bracket is adjustable by selectively using two of the plurality of mounting holes.

19. The fastening system of claim 15, wherein the second bracket is adjustable by selectively using two of the plurality of mounting holes.

* * * * *